United States Patent [19]

Ibuki et al.

[11] Patent Number: 4,863,754
[45] Date of Patent: Sep. 5, 1989

[54] MOIST PELLET FEED FOR BREEDING FISH

[75] Inventors: Masahisa Ibuki, Takatsuki; Hiroshi Sugai, Kyoto; Masanori Wakui, Niigata, all of Japan

[73] Assignee: Dai-Ichi Kogyo Seiyaku Co., Ltd., Kyoto, Japan

[21] Appl. No.: 146,894

[22] Filed: Jan. 22, 1988

[30] Foreign Application Priority Data

Feb. 2, 1987 [JP] Japan .................................. 62-23370

[51] Int. Cl.⁴ ................................................ A23K 1/10
[52] U.S. Cl. ...................................... 426/643; 426/646
[58] Field of Search ....................... 426/623, 1, 2, 643, 426/646

[56] References Cited

FOREIGN PATENT DOCUMENTS

| | | | |
|---|---|---|---|
| 2287852 | 6/1976 | France | 426/1 |
| 0033884 | 3/1978 | Japan | 426/1 |
| 0054593 | 5/1978 | Japan | 426/1 |
| 0143595 | 12/1978 | Japan | 426/1 |
| 0005056 | 1/1981 | Japan | 426/1 |
| 1242548 | 10/1986 | Japan | 426/1 |

OTHER PUBLICATIONS

*The Progressive Fish-Culturist*, pp. 175–180, "Oregon Pellets", by Wallace F. Hublou.

*Primary Examiner*—R. B. Penland

[57] ABSTRACT

Moist pellet feed for breeding fish comprising (A) not less than 50 parts by weight of a raw feed, (B) not more than 50 parts by weight of a powdery mixed feed, and (C) a sodium carboxymethyl cellulose which has free carboxylic acid groups in the molecule and which, as a 1% aqueous solution at 25° C., has a viscosity of not less than 1000 cps, wherein an equivalent ratio of free carboxylic acid groups to sodium carboxylate groups in said sodium carboxymethyl cellulose is preferably from 0.005:1 to 0.02:1, and the amount of said component (C) is from 0.5 to 10% by weight based on the total amount of said components (A) and (B). By using the specific binding agent, the moist pellet feed has a proper hardness and little to not stickiness.

2 Claims, No Drawings

4,863,754

MOIST PELLET FEED FOR BREEDING FISH

BACKGROUND OF THE INVENTION

The present invention relates to moist pellet feed for breeding fish, and more particularly to moist pellet feed for breeding fishes comprising a raw feed and a powdery mixed feed, wherein the amount of the raw feed is equal to or more than that of the powdery mixed feed.

Hitherto, there have been generally known dry pellet feed for breeding fish. However, the dry pellet feed having no water is undesirable as feed for breeding the saltwater fish such as a yellowtail, since the saltwater fish drink seawater and excrete excess body salinity through the gill and water is supplied through the gill. Dry pellet feeds having no water are not suitable for such fish. Therefore, it is desirable to develop various moist pellet feeds containing a lot of water.

Moist pellets contain a lot of water, and are prepared by admixing raw feeds, i.e., small fish such as saurels, sardines, saurys, mackerels and sand eels, which may be raw or refrigerated, with powdery mixed feeds composed of fish meals, minerals, vegetable oil cakes, grains, chaffs and brans and the like, and a binding agent, and by pelletizing the mixture. The raw feed may be minced, sliced or filleted. The moisture contained in the moist pellets is the moisture of the raw feed (fish) and the moisure in the mixed feeds. In case of moist pellets composed of the raw feeds and the mixed feeds in a weight ratio of 5:5, the water content in the moist pellets is about 50% by weight. (Generally, water content in the raw feeds are about 75 to about 85% by weight). The present invention relates to such moist pellet feeds for breeding fish, which have a high water content.

The moist pellets have the advantage that they do not readily go to pieces in seawater and reduce the death rate of fish. In order to obtain the above-mentioned advantage, however, it is usually required to include a binding agent in the moist pellets. Examples of the binding agents are, for instance, sodium alginate, guar gum, sodium polyacrylate, carboxymethyl cellulose, and the like. However, these binding agents have the disadvantage that when moist pellets have raw feed in an amount of not less than 50% by weight, the binding property is insufficient due to a lot of moisture in the pellets with the pellets becoming sticky and adhering to each other, and thus moist pellets having a form that fish can easily eat are not obtained.

As aforementioned, there have not been provided final products having sufficient practicality, that is, there have been no economical moist pellets containing not less than 50% by weight of raw feeds, and having sufficient hardness to be easily eaten by fish.

The present inventors have paid attention to binding agents which perform the most important function in the moist pellet feeds for breeding fish, particularly, to a carboxymethyl cellulose which has been most widely used as the binding agent in recent days.

An object of the present invention is to provide economical, moist pellet feed for breeding fish, having a sufficient hardness and no stickiness for preventing adhesion between the pellets, and having a high content of raw feeds.

This and other objects of the present invention will become apparent from the following description given hereinafter.

SUMMARY OF THE INVENTION

In the present invention, by improving a binding agent in moist pellets, the above-mentioned object can be attained even if the binding agent is present in a small amount.

In accordance with the present invention, there is provided a moist pellet feed for breeding fish comprising:

(A) not less than 50 parts by weight of a raw feed, (B) not more than 50 parts by weight of a powdery mixed feed, the total amount of the components (A) and (B) being 100 parts by weight, and (C) a sodium carboxymethyl cellulose which has a free carboxylic acid group in its molecule and which, as a 1% by weight aqueous solution, has a viscosity at 25° C. of not less than 1000 cps;

the amount of the component (C) being from 0.5 to 10% by weight based on the total amount of the components (A) and (B).

DETAILED DESCRIPTION

In the present invention, not less than 50 parts by weight of a raw feed (A) is knead with not more than 50 parts by weight of a powdery mixed feed (B) containing fish meals as a main component, the total amount of the raw feed (A) and the mixed feed (B) being 100 parts by weight, to which a sodium carboxymethyl cellulose which has free carboxylic acid groups in its molecule which, as a 1% by weight aqueous solution at 25° C., has a viscosity of not less than 1000 cps is added as a binding agent in an amount of 0.5 to 10% by weight based on the total amount of the components (A) and (B). The viscosity is measured by using a Brookfield type viscometer made by Tokyo Seiki Kabushiki Kaisha at a rotor speed of 30 rpm.

In the present invention, it is preferable to use a water-soluble sodium carboxymethyl cellulose, that is, it is preferable to use a sodium carboxymethyl cellulose having an average degree of substitution (hereinafter referred to as "DS") of not less than 0.45. The term "degree of substitution" as used herein means a degree of substitution per glucose unit. Also, it is preferable that an equivalent ratio of free carboxylic acid groups to sodium carboxylate groups in the sodium carboxymethyl cellulose is from 0.005:1 to 0.02:1, more preferably, from 0.006:1 to 0.015:1.

The sodium carboxymethyl cellulose used in the present invention is partially acidified with an acid in the sodium salt part and is partially cross-linked.

It is easy to subject sodium carboxymethyl cellulose to the partial acidification in a known technique. For example, sodium carboxymethyl cellulose is formed into a slurry with methanol or the like, and the slurry is reacted with a mineral acid such as hydrochloric acid, nitric acid or sulfuric acid, or an organic acid such as acetic acid or citric acid. The above reaction is conducted almost chemically equivalently in stoichiometry, and accordingly, it is possible to exactly control a ratio of the free carboxylic acid groups to the sodium carboxylate groups by controlling an amount of the acid.

DS in the sodium carboxymethyl cellulose partially acidified is the total value of DS of free carboxylic acid groups and DS of sodium carboxylate groups. When using the sodium carboxymethyl cellulose having the ratio of DS of free carboxylic acid groups to DS of sodium carboxylate groups (that is, the equivalent ratio of free carboxylic acid groups to sodium carboxylate groups) of from 0.005:1 to 0.02:1, the moist pellets are satisfactory in hardness and stickiness, and are easily handled. When the ratio of DS of free carboxylic acid groups to DS of sodium carboxylate groups is less than the above range, the moist pellets are lowered in hardness and become sticky. Also, when the ratio is more than the above range, the moist pellets are suddenly lowered in hardness and become sticky.

The ratio of DS of free carboxylic acid groups to DS of sodium carboxylate groups is acid-base titrimetrically determined.

In the present invention, the sodium carboxymethyl cellulose is cross-linked and the degree of the cross-linking is an important factor. In general, it has been known that sodium carboxymethl celluloses can be cross-linked with an acid or heating, as shown in Japanese Examined Patent Publication No. 22880/1968. The sodium carboxymethyl cellulose partially acidified with an acid can be cross-linked under usual drying conditions e.g., by heating at 100° C. for about 30 minutes to about 5 hours.

Since it is essential that the binding agent used in the moist pellets of the present invention is water-soluble, it is not required to highly cross-link the sodium carboxymethyl cellulose. Accordingly, it is necessary that the sodium carboxymethyl cellulose is low cross-linked so that the water solubility is not lost.

The degree of cross-linking can be presumed from a viscosity of a 1% by weight aqueous solution of the sodium carboxymethyl cellulose. In the present invention, it is necessary that the 1% by weight aqueous solution has a viscosity of not less than 1000 cps, and it is preferable that the 1% by weight aqueous solution has a viscostiy of not less than 5000 cps from the viewpoint of economy.

When the viscosity of the 1% by weight aqueous solution is less than 1000 cps, the moist pellets are lowered in hardness and become sticky.

In the present invention, the sodium carboxymethyl cellulose is added to the mixture of the raw feed (A) and the mixed feed (B) in an amount of 0.5 to 10% by weight, preferably from 1 to 5% by weight, based on the total amount of the raw feed (A) and the mixed feed (B). When the amount of the sodium carboxymethyl cellulose is less than 0.5% by weight, the moist pellets are lowered in hardness, and water is separated from the pellets. On the other hand, when the amount is more than 10% by weight, the moist pellets cannot be easily handled and it is uneconomical.

When using the sodium carboxymethyl cellulose which is partially acidified with an acid and partially cross-linked as the binding agent of the moist pellets, the obtained moist pellets are remarkably improved in hardness and are scarcely sticky in comparison with moist pellets when ordinary sodium carboxymethyl cellulose is used as the binding agent.

In the present invention, the moist pellets may further include binding agents used generally as binding agents for feeds such as guar gum, sodium polyacrylate, sodium alginate or sodium caseinate.

The present invention is more specifically described and explained by means of the following Examples and Comparative Examples in which all percentages and parts are by weight unless otherwise noted. It is to be understood that the present invention is not limited to the Examples, and various changes and modifications may be made in the invention without departing from the spirit and scope thereof.

EXAMPLES 1 AND 6 AND COMPARATIVE EXAMPLES 1 TO 5

A powdery mixed feed (X) was prepared by admixing 49 parts of fish meal (from Sakai-minato) with 1 part of each of sodium carboxymethyl celluloses shown in Table 1. On the other hand, a raw feed (Y) was prepared by mincing refrigerated sardines with a meat chopper made by Kabushiki Kaisha Hiraga Kosakusho. The powdery mixed feed (X) was admixed with the raw feed (Y) in a weight ratio of the mixed feed (X) to the raw feed (Y) of 1:1, and the mixture was formed into moist pellets having a diameter of 13 mm by using a pelletizer made by Kabushiki Kaisha Hiraga Kosakusho.

As to the obtained moist pellets, the hardness and the stickiness were estimated by conducting a sensory test wherein each of five monitors touch the moist pellets with their fingers.

The results are shown in Table 1.

Also, DS in sodium carboxymethyl cellulose used in each Examples and Comparative Examples, DS of free carboxylic acid groups, DS of sodium carboxylate group, and a viscosity of a 1% aqueous solution of sodium carboxymethyl cellulose are shown in Table 1.

TABE 1

| | Sodium carboxymethyl cellulose | | | | | |
|---|---|---|---|---|---|---|
| Ex. No. | DS Total DS of (a) and (b) | DS of free carboxylic acid groups (a) | DS of Sodium carboxylate groups (b) | Viscosity 1% aqueous solution | Hardness*[1] | Stickiness |
| Ex. 1 | 0.60 | 0.013 | 0.587 | 1090 | ○ | No |
| Ex. 2 | 0.60 | 0.010 | 0.590 | 1001 | ◎ | No |
| Ex. 3 | 0.60 | 0.005 | 0.595 | 1004 | ◎ | No |
| Ex. 4 | 0.58 | 0.003 | 0.577 | 1051 | ◎ | No |
| Ex. 5 | 0.55 | 0.001 | 0.549 | 1001 | ◎ | Slightly sticky |
| Ex. 6 | 0.70 | 0.010 | 0.690 | 5200 | ○ | No |
| Com. Ex. 1 | 0.60 | 0.000 | 0.600 | 1035 | X | Sticky |
| Com. Ex. 2 | 0.70 | 0.000 | 0.700 | 5010 | △ | Slightly sticky |
| Com. Ex. 3 | 0.65 | 0.012 | 0.638 | 302 | △ | Slightly sticky |
| Com. Ex. 4 | 0.64 | 0.007 | 0.633 | 305 | △ | Sticky |

TABLE 1-continued

| Ex. No. | Sodium carboxymethyl cellulose | | | | Hardness*1 | Stickiness |
| --- | --- | --- | --- | --- | --- | --- |
| | DS Total DS of (a) and (b) | DS of free carboxylic acid groups (a) | DS of Sodium carboxylate groups (b) | Viscosity 1% aqueous solution | | |
| Com. Ex. 5 | 0.64 | 0.000 | 0.640 | 300 | X | Sticky |

*1[Estimation]
⊙ : Very Hard
◯ : Hard
△: Slightly soft
X: Soft

From the results of Table 1, it will be understood that the moist pellets of the present invention (Example 1 to 6) are practical, but the moist pellets in which the sodium carboxymethyl cellulose have no free carboxylic acid groups (Comparative Examples 1, 2 and 5) or the moist pellets in which the sodium carboxymethyl cellulose whose 1% aqueous solution has a viscosity of less than 1000 cps (Comparative Examples 3, 4 and 5) are not practical.

Particularly, when the ratio of DS of free carboxylic acid groups to DS of sodium carboxylate is within the range of 0.005:1 to 0.02:1 (Ex. 2, 3, 4, 6), the obtained moist pellets were remarkably excellent in hardness as well as the stickiness.

EXAMPLES 7 TO 9 AND COMPARATIVE EXAMPLES 6 AND 7

A powdery mixed feed (X) was prepared by admixing 69 parts of fish meal (from Sakai-minato) with 1 part of each of sodium carboxymethyl celluloses shown in Table 2. On the other hand, a raw feed (Y) was prepared by mincing refrigerated sardins with the same meat chopper as used in Example 1. The powdery mixed feed (X) and the raw feed (Y) were admixed in a weight ratio of the mixed feed (X) to the raw feed (Y) of 3:7 and the mixture was formed into moist pellets having a diameter of 13 mm by using the same pelletizer as used in Example 1.

The results are shown in Table 2.

| Ex. No. | Sodium carboxymethyl cellulose | | | | Hardness | Stickiness |
| --- | --- | --- | --- | --- | --- | --- |
| | DS (Total DS) of (a) and (b) | DS of free carboxylic acid groups (a) | DS of sodium carboxylate groups (b) | Viscosity 1% aqueous solution | | |
| Ex. 7 | 0.60 | 0.010 | 0.590 | 1001 | ◯ | No |
| Ex. 8 | 0.60 | 0.005 | 0.595 | 1004 | ◯ | No |
| Ex. 9 | 0.70 | 0.010 | 0.690 | 5200 | ⊙ | No |
| Com. Ex. 6 | 0.70 | 0.000 | 0.700 | 5010 | X | Sticky |
| Com. Ex. 7 | 0.65 | 0.012 | 0.638 | 302 | X | Sticky |

From the results of Table 2, it can be understood that the moist pellets of the present invention (Examples 7 to 9) are practical even in the case of water content in the moist pellets being high, and particularly, when using the sodium carboxymethyl cellulose whose 1% aqueous solution has a high viscosity (Example 9), the obtained moist pellets are very excellent. However, when using the sodium carboxymethyl cellulose having no free carboxylic acid group (Comparative Example 6) or the sodium carboxymethyl cellulose whose 1% aqueous solution has a low viscosity (less than 1000 cps) (Comparative Example 7), the obtained moist pellets are not practical.

As shown in Examples 1 to 9 and Comparative Examples 1 to 7, the present invention can provide practical moist pellet feeds for breeding fish, which has a proper hardness as well as no stickiness, by using even a small amount of the specific binding agent even if the moist pellets contain not less than 50% by weight of the raw feed, that is, the present invention can provide economically moist pellet feed having excellent properties.

In addition to the ingredients used in the Examples, other ingredients can be used in the Examples as set forth in the specification to obtain substantially the same results.

What we claim is:

1. A moist pellet feed for breeding fish, consisting essentially of:
   (A) not less than 50 parts by weight of a raw fish;
   (B) not more than 50 parts by weight of a powdery fish meal, the total amount of said components (A) and (B) being 100 parts by weight, and
   (C) a sodium carboxymethyl cellulose binding agent which has a free carboxylic acid group in the molecule and which, as a 1% by weight aqueous solution at 25° C., has a viscosity of not less than 1000 cps, wherein an equivalent ratio of free carboxylic acid groups to sodium carboxylate groups in said sodium carboxymethyl cellulose is from 0.005:1 to 0.02:1, and the amount of said component (C) being from 0.5 to 10% by weight based on the total amount of said components (A) and (B).

2. The feed of claim 1, wherein said sodium carboxymethyl cellulose has an average degree of substitution of not less than 0.45.

* * * * *